United States Patent Office 2,717,217
Patented Sept. 6, 1955

---

2,717,217

PROCESS OF PREPARING COATED FABRICS

David J. Sullivan, Bridgeport, Conn., assignor to E. I. du Pont de Nemours and Company, Wilmington, Del., a corporation of Delaware No Drawing. Application January 12, 1954,
Serial No. 403,650

6 Claims. (Cl. 117—76)

This invention relates to a process of preparing coated fabrics and more particularly to a process involving the application of synthetic rubber latices to a fabric substrate by means of a doctoring device.

Due to the frothy nature of synthetic rubber latices it is difficult, if not impossible, to prepare fabric coating compositions therefrom which do not include air which is present in the latex and/or is introduced during the mixing of the latex with compounding ingredients. A synthetic rubber latex coating composition containing a substantial proportion of occluded air when employed for coating textile fabrics results in a porous coating.

In order to obtain homogeneous dispersions it is generally necessary to separately disperse the particulate compounding ingredients in water with the aid of wetting agents and emulsify the oily liquids in water with the aid of emulsifying agents. The slurry and emulsion are then blended with the latex. The blending or mixing of the slurry and emulsion with the synthetic rubber latex introduces air into the composition and when subjected to deaeration by conventional means, such as, e. g., exposure to a partial vacuum, the composition froths and foams to such an extent that it is not possible to remove the occluded air.

The coating compositions prepared by blending an aqueous slurry and aqueous emulsion with commercial synthetic rubber latices, containing 35–60% solids, are too fluid for application to a flexible fabric base by means of a doctoring device and require thickening or bodying. Such aqueous compositions may be bodied by adding water soluble film forming materials, such as, e. g. methyl cellulose, or they may be thickened by concentrating the composition by evaporation of water. This invention is concerned with this latter method of concentrating and thickening the compounded latex coating composition.

Throughout the specification and claims the term "synthetic rubber latex" is used to denote aqueous dispersions of synthetic rubbers, such as, e. g., neoprene (polychloroprene), copolymer of butadiene and styrene and copolymer of butadiene and acrylonitrile.

An important object of this invention is the provision of a method for the preparation of coated fabrics by doctor knife application of synthetic rubber latex coating compositions to a suitably prepared textile fabric. A further object is the provision of a method of simultaneously removing occluded air and concentrating a compounded synthetic rubber latex. A still further object is the provision of a method of preparing dense essentially pore-free coatings from compounded synthetic rubber latex on a fabric substrate. These and other important objects will become readily apparent as the description of the invention proceeds.

The objects of this invention are accomplished by separately preparing an aqueous slurry of dry particulate compounding ingredients, separately emulsifying oily compounding ingredients, blending the slurry and the emulsion with a synthetic rubber latex, such as e. g., neoprene latex, "Hycar" latex and "GR-S" latex, and other compounding ingredients to form a coating composition having a viscosity too low for doctor knife application. The coating composition is simultaneously concentrated and deaerated by subjecting a thin wet film of it to heated moving air until it has a viscosity of 6,000 to 16,000 centipoises and is substantially free of occluded air. The concentrated and deaerated composition is applied to a flexible substrate by means of a doctoring device and then passed through a heat zone to evaporate the volatile components and produce a dense, bubble-free coating which is further heated to effect a cure of the coating.

Unless otherwise noted, the parts and percentage figures throughout the specification and claims are expressed on a weight basis.

EXAMPLE I

A lightweight closely woven nylon parachute fabric weighing 1.8 ounces per square yard was doctor knife coated on each side with one coat of the following composition:

*Primer coating composition*

| | Parts by wt. |
|---|---|
| "Hycar" OR–15—copolymer of butadiene and acrylonitrile | 7.8 |
| BR–17620—phenol/formaldehyde resin | 7.8 |
| Acetone | 84.4 |
| | 100.0 |

Sufficient primer composition was applied by means of a doctor knife on each side to deposit a total of about 0.25 ounce per square yard of non-volatile components.

The primed fabric was next base coated on one side with two coats of the following composition:

*Base coating composition*

| | Parts by wt. |
|---|---|
| "Paracril" B—copolymer of butadiene and acrylonitrile | 19.9 |
| Carbon black | 11.1 |
| Calcium carbonate | 4.0 |
| Stearic acid | .2 |
| Zinc oxide | 1.0 |
| "Neozone" D—phenyl beta naphthylamine | .2 |
| Sebacic diester of monobutyl ether of ethylene glycol | 8.0 |
| Sulfur | .3 |
| Benzothiazyl disulfide | .3 |
| Methyl ethyl ketone | 55.0 |
| | 100.0 |

The above dry ingredients are thoroughly mixed on a two-roll rubber mill after which the 45 parts of the milled ingredients are dissolved in the 55 parts of methyl ethyl ketone.

Sufficient base coating composition was applied to one side of the primed fabric by the two coats to deposit .5 ounce per square yard of non-volatile components and close the interstices of the fabric.

"Hycar" latex coating composition

| | Percent By Wt. | |
|---|---|---|
| | Wet | Dry |
| Aqueous Slurry of Dry Particulate Compounding Ingredients: | | |
| Water _____ 54.2 | | |
| Marasperse CB—Partially desulfonated sulfonated lignin _____ 1.0 | | |
| Sulfur _____ .7 | 38.6 | 37.9 |
| Benzothiazyl disulfide _____ .7 | | |
| Zinc oxide _____ 2.5 | | |
| Carbon black _____ 40.9 | | |
| 100.0 | | |
| Plasticizer Emulsion: | | |
| High temperature reaction product of diphenylamine and acetone _____ 1.6 | | |
| Sebacic diester of monobutyl ether of ethylene glycol _____ 63.7 | | |
| Oleic acid _____ 1.3 | 12.4 | 17.8 |
| 28% Ammonia _____ .3 | | |
| Water _____ 33.1 | | |
| 100.0 | | |
| Stabilizer Solution: | | |
| Water _____ 85.8 | | |
| "Dowicide" A—Sodium salt of o-phenylphenol _____ .2 | 3.9 | 1.0 |
| Sodium hydroxide _____ 4.0 | | |
| Zein _____ 10.0 | | |
| 100.0 | | |
| 10% Aqueous solution of "Aquarex" ME* _____ | 5.9 | 1.3 |
| "Hycar" 1552 (Copolymer of butadiene and acrylonitrile) latex—50% solids _____ | 39.2 | 42.0 |
| Dow Corning Silicone Anti-Form _____ | Trace | Trace |
| | 100.0 | 100.0 |

Non-Volatile Components By Wt.: 46.7%.

*"Aquarex" ME is the sodium salt of the sulfate monoesters of a mixture of higher fatty alcohols consisting primarily of lauryl and myristyl derivatives.

The above composition was concentrated to 65% solids by weight and freed of occluded air, as described below, before it was applied to the previously coated fabric by means of a doctor knife.

After each successive coat of the concentrated air-free latex coating composition to the base coated side of the fabric it was passed through a heat zone to expel the volatile components of the coating composition. Sufficient concentrated latex composition was applied in a plurality of coats to give the coated fabric a total dry thickness of .009 inch at this stage of manufacture.

The side of the fabric with the one coat of primer coating composition was further coated with one additional coat of the above primer coating composition followed by two coats of the above base coating composition and finally a plurality of coats of the concentrated air-free latex coating composition, described above. After each successive coat the material was passed through a heat zone to evaporate the volatile components of the coating compositions. Sufficient concentrated latex composition was applied to increase the dry thickness of the coated fabric to about .013 inch. Following the application of the last coat each side of the coated fabric was talced to reduce the surface tack. The coated fabric was heated for three hours at 260° F. to cure the coating.

The coated fabric was flexible and had properties equivalent to a similar coated fabric made with a ketone solution of a "Hycar" coating composition in place of the aqueous latex composition.

The "Hycar" latex composition was prepared by separately preparing an aqueous slurry of the dry particulate compounding ingredients. An emulsion of the oily ingredients was also separately prepared. The slurry and emulsion were then added to the "Hycar" latex along with a trace of a silicone anti-foaming agent. The composition was then thoroughly mixed by paddle stirring. At 46.7% by weight of non-volatile components the composition was too thin or fluid for practical doctor knife application. The composition also contained occluded air which was introduced through the slurry, emulsion and "Hycar" latex and also during the blending operation. It was necessary to remove substantially all the occluded air to prevent the formation of a porous coating and concentrate the latex to a practical doctor knife coating viscosity. A Brookfield viscosity of at least 6,000 centipoises (#3 spindle at 6 R. P. M.) is necessary for satisfactory doctor knife application. Due to the frothy nature of the latex containing composition it is not practical to use a vacuum to remove occluded air. A disc type concentrator differing from that described in U. S. Patent 2,397,818, in that the discs were all equally spaced apart, has been found satisfactory for concentrating the latex to a practical coating viscosity and simultaneously removing the occluded air from the latex composition.

As the latex coating compositions are concentrated by the disc type concentrator the thin layers of wet film are exposed to heated moving air blown over the rotating discs which evaporates the water in the exposed thin films and any of the occluded air in the form of bubbles escapes from the thin films. As the concentration continues and the viscosity approaches 16,000 centipoises any occluded air still present in the coating composition does not escape and the agitation of the compositions by the revolving discs introduces air bubbles back into the composition. While it is practical to coat compositions having a viscosity greater than 16,000 centipoises, the compositions of this invention concentrated to a higher viscosity contain sufficient occluded air to result in porous coatings containing innumerable air spaces.

After concentrating the above compounded latex composition to 65% solids by weight and a viscosity of about 12,000 centipoises the occluded air was appreciably reduced and when it was coated on the primed and base coated fabric there was formed a dense bubble-free coating upon drying. If the concentration is continued after the viscosity of the compounded latex composition reaches about 16,000 centipoises, occluded air is reintroduced into the composition. When the composition concentrated to a viscosity above about 16,000 centipoises is applied over the primed and base coated fabric there is an increase in porosity of the coating, with corresponding decrease in density.

EXAMPLE II

A flexible diaphragm material was made by coating each side of a Grade A cotton airplane fabric with one coat of the following composition:

| | Per cent by wt. |
|---|---|
| Neoprene | 33.3 |
| "Akroflex" C (65% phenyl alpha naphthylamine) | 1.0 |
| Magnesium oxide | 1.3 |
| Carbon black | 16.7 |
| Stearic acid | .1 |
| Zinc oxide | 5.0 |
| FF Wood rosin | 3.4 |
| Methyl ethyl ketone | 39.2 |
| | 100.0 |

Sufficient of the above composition was applied to the fabric base by means of a doctor knife to deposit .5 ounce of non-volatile ingredients per square yard on each side. After each coat the fabric was passed through a heat zone to expel the volatile solvent.

The base coated fabric was further coated on each side with a concentrated air-free neoprene latex coating composition prepared as follows:

Neoprene latex coating composition

| | Percent by Wt. | |
|---|---|---|
| | Wet | Dry |
| Aqueous Slurry of Dry Particulate Compounding Ingredients: | | |
| Water_____ 49.1 | | |
| Marasperse CB—Partially desulfonated lignin_____ 1.0 | | |
| Dibetanaphthyl paraphenylene diamine____ 2.5 | | |
| Sulfur_____ .8 | 37.0 | 34.0 |
| Thiocarbanilide_____ .8 | | |
| Zinc oxide_____ 12.5 | | |
| Dixie clay_____ 8.3 | | |
| Carbon black_____ 25.0 | | |
| | 100.0 | |
| Plasticizer Emulsion: | | |
| Circo oil (Mixture of pure petroleum hydrocarbons)_____ 65.0 | | |
| Oleic acid_____ 1.3 | 7.1 | 8.5 |
| 28% Ammonia_____ .4 | | |
| Water_____ 33.3 | | |
| | 100.0 | |
| Neoprene Latex—601A (60% solids)_____ | 51.4 | 57.7 |
| 10% Aqueous solution of "Aquarex" ME_____ | 4.5 | .8 |
| Dow Corning Silicone—Anti-foam_____ | Trace | Trace |
| | 100.0 | 100.0 |

Non-Volatile Components By Wt.: 54.4%.

The above neoprene latex coating composition, after thorough mixing, was frothy, contained considerable occluded air and was too fluid for doctor knife application to a flexible substrate. It was freed of occluded air and concentrated on a disc type concentrator, as in the case of Example I, to a concentration of 65% by weight and a viscosity of 12,000 centipoises, as measured on the Brookfield viscosimeter, using the #3 spindle at 6 R. P. M.

One coat of the concentrated composition was applied to each side of the base coated fabric by means of a doctor knife. After each coat the fabric was passed through a heat zone to expel the volatile solvent. Sufficient concentrated latex composition was applied on each side to give a total thickness after drying of .012 inch. The dried coated fabric was dusted on each side with mica to reduce the surface tack and then cured for 3 hours at 260° F.

The cured coating was tough, flexible, dense and as free of pores as a similar product made from a hydrocarbon solution of the same neoprene coating.

EXAMPLE III

A flexible diaphragm material was made by coating each side of a closely woven nylon fabric weighing 5.5 ounces per square yard with a concentrated air-free "GR–S" latex coating composition prepared as follows:

"GR–S" latex coating composition

| | Percent by Wt. | |
|---|---|---|
| | Wet | Dry |
| Aqueous Slurry of Dry Particulate Compounding Ingredients: | | |
| Water_____ 59.2 | | |
| Marasperse CB_____ .8 | | |
| Sulfur_____ 1.1 | | |
| Accelerator 2 MT_____ .8 | | |
| Tetramethyl thiuram monosulfide_____ .1 | 42.0 | 38.0 |
| Dibetanaphthyl paraphenylene diamine____ 1.7 | | |
| Zinc oxide_____ 2.8 | | |
| Dixie clay_____ 5.6 | | |
| Carbon black_____ 27.9 | | |
| | 100.0 | |
| Plasticizer Emulsion: | | |
| Circo oil_____ 65.0 | | |
| Oleic acid_____ 1.3 | 5.4 | 7.8 |
| 28% Ammonia_____ .4 | | |
| Water_____ 33.3 | | |
| | 100.0 | |
| 10% Aqueous solution of "Aquarex" ME_____ | 4.7 | 1.1 |
| "GR–S" Latex #2100 (48.7% Copolymer of butadiene and styrene and 51.3% water)_____ | 47.9 | 53.1 |
| | 100.0 | 100.0 |

Percent Solids: 46.3%.

The above "GR–S" latex composition was prepared in the same manner as described above and was quite frothy and contained considerable occluded air. The viscosity of the above composition as prepared was about 170 centipoises and was too fluid for satisfactory doctor knife application. The composition was concentrated and deaerated by means of the disc type concentrator, as described in Example I, to a concentration of 62% solids and a viscosity of about 11,000 centipoises. (Brookfield #3 Spindle 6 R. P. M.)

The concentrated and deaerated "GR–S" latex coating composition was applied directly to both sides of the nylon fabric by means of a doctor knife. One side was coated with about 4 ounces of non-volatile ingredients per square yard in one coat and the other side with about 2 ounces of non-volatile ingredients per square yard in one coat. After each coat the fabric was passed through a heat zone to dissipate the volatile components. The coated fabric was then heated for about 3 hours at 260° F. to cure the coating.

The compositions of this invention, as prepared and before concentrating are too low in viscosity for doctor knife application to flexible substrates. As pointed out above, viscosities below 6,000 centipoises are too low for practical doctor knife application and, when concentrated to viscosities above 16,000 centipoises, occluded air is re-introduced which results in porous coatings containing innumerable air spaces.

Where flexibility of the coated fabric is not important the plasticizer may be omitted from the latex coating compositions.

The invention is not to be limited to the particular fabrics disclosed in the examples since other fabric constructions and other types of fibers can be used equally as well. In the case of cotton fabrics it is highly desirable to base coat the cotton fabric with a solution of the synthetic rubber in a hydrocarbon solvent before applying the aqueous latex coating compositions. The aqueous compositions applied directly to cotton fabrics result in excessive shrinkage of the fabric during the coating and drying operations. In place of the woven nylon and cotton fabrics mentioned in the specific examples it is within the scope of this invention to employ non-woven nylon and cotton fabrics as well as woven or non-woven fabrics made from other fibers, such as, e. g. polyethylene terephthalate, polyacrylonitrile, glass and viscose rayon.

In the specific examples the concentrated and deaerated synthetic rubber latex coating compositions are applied by means of a doctor knife. The compositions of this invention may also be applied to the fabric substrates by other doctoring devices such as driven and undriven rollers as well as stationary rollers.

It is apparent that many widely different embodiments of this invention may be made without departing from the spirit and scope thereof and, therefore, it is not intended to be limited except as indicated in the appended claims.

I claim:

1. Process of preparing dense, substantially bubble-free coatings on a flexible substrate which comprises separately preparing an aqueous slurry of dry particulate compounding ingredients, separately emulsifying oily compounding ingredients, blending said slurry and said emulsion with a synthetic rubber latex to form a coating composition having a viscosity too low for doctor knife application and containing occluded air, said synthetic rubber being selected from the group consisting of neoprene, copolymer of butadiene and acrylonitrile, and copolymer of butadiene and styrene, simultaneously concentrating and deaerating said composition by subjecting a thin wet film to heated moving air, continuing the concentrating and deaerating until said composition has a viscosity of 6,000 to 16,000 centipoises and is substantially free of occluded air, applying the concentrated and deaerated composition to a substrate by means of a doctoring device, passing the coated substrate through a heat zone to evaporate the volatile components and produce a dense, bubble-free coating and further heating the coated fabric to cure the coating.

2. Process of preparing dense, substantially bubble-free coatings on a substrate which comprises separately preparing an aqueous slurry of dry particulate compounding ingredients, blending said slurry with a synthetic rubber latex to form a coating composition having a viscosity too low for doctor knife application and containing occluded air, said synthetic rubber being selected from the group consisting of neoprene, copolymer, of butadiene and acrylonitrile, and copolymer of butadiene and styrene, simultaneously concentrating and deaerating said composition by subjecting a thin wet film to heated moving air, continuing the concentrating and deaerating until said composition has a viscosity of 6,000 to 16,000 centipoises and is substantially free of occluded air, applying the concentrated and deaerated composition to a substrate by means of a doctoring device, passing the coated substrate through a heat zone to evaporate the volatile components and produce a dense bubble-free coating, and further heating the coated fabric to cure the coating.

3. Process of preparing dense bubble-free coatings on a fabric substrate which comprises base coating at least one side of a fabric substrate with a solution of a synthetic rubber in a volatile organic liquid to close the interstices of said fabric, passing the coated fabric through a heat zone to evaporate the organic liquid, separately preparing an aqueous slurry of dry particulate compounding ingredients, separately emulsifying oily compounding ingredients, blending said slurry and said emulsion with a synthetic rubber latex to form a coating composition having a viscosity too low for doctor knife application and containing occluded air, the synthetic rubber in said solution and said latex being selected from the group consisting of neoprene, copolymer of butadiene and acrylonitrile, and copolymer of butadiene and styrene, simultaneously concentrating and deaerating said composition by subjecting a thin wet film thereof on a moving surface to heated moving air, continuing the concentration and deaeration until said composition has a vicosity of 6,000 to 16,000 centipoises and is substantially free of occluded air, applying the concentrated and deaerated composition to the coated side of said coated fabric by means of a doctoring device, passing the coated fabric through a heat zone to evaporate the volatile portion of said coating composition and produce a dense bubble-free coating and further heating the coated fabric to cure the coating.

4. The process of claim 1 in which the substrate is nylon fabric.

5. The process of claim 1 in which the substrate is cotton fabric.

6. The process of claim 1 in which the doctoring device is a doctor knife.

References Cited in the file of this patent

UNITED STATES PATENTS

| | | |
|---|---|---|
| 2,397,818 | Tausch | Apr. 2, 1946 |
| 2,405,038 | Jennings | July 30, 1946 |
| 2,431,001 | Sullivan | Nov. 18, 1947 |
| 2,459,874 | Fay | Jan. 25, 1949 |
| 2,556,262 | Faeber | June 12, 1951 |

OTHER REFERENCES

Ellis: The Chemistry of Synthetic Resins, vol. 1, Reinhold Publishing Corp., 1935, page 435.